June 10, 1930.   F. J. WOLFARTH ET AL   1,763,620
MACHINE FOR FORMING BUNS AND THE LIKE
Filed May 16, 1929

INVENTORS
FRANK J. WOLFARTH
BY   WILLIAM W. DUANT

George R. Willcox ATTORNEY

Patented June 10, 1930

1,763,620

UNITED STATES PATENT OFFICE

FRANK J. WOLFARTH AND WILLIAM W. DUANT, OF SAGINAW, MICHIGAN; SAID DUANT ASSIGNOR TO SAID WOLFARTH

MACHINE FOR FORMING BUNS AND THE LIKE

Application filed May 16, 1929. Serial No. 363,528.

This invention relates to machines for forming dough pieces from which buns are to be baked and the invention pertains to an improved mechanism whereby a dough piece of suitable size dropped into the hopper of the machine is automatically rolled into circular disk shape and discharged from the machine. When such a disk-shaped dough piece is baked it assumes the well known form of a so-called round bun, which in plan is circular and in cross section approximately semi-elliptical.

Heretofore it has been customary to pass a spherical dough piece between rollers to roll it into elliptical form, then to discharge it upon a table, from which it is picked up and fed by hand through a second pair of rolls where it is further flattened and converted from elliptical form into substantially circular shape. Such a machine, however requires manual manipulator of each dough piece after it leaves the first pair of rolls and before it enters the second pair.

It is an object of our invention to provide a machine that will form circular dough disks automatically and at a much higher rate of production than is possible with the method above mentioned.

With the foregoing and certain other objects in view, which will appear later in the specification, our invention comprises the devices discribed and claimed and the equivalents thereof.

In the drawings Fig. 1 is a plan view of the machine, the top roller of the lower pair of rollers removed.

Figure 1:
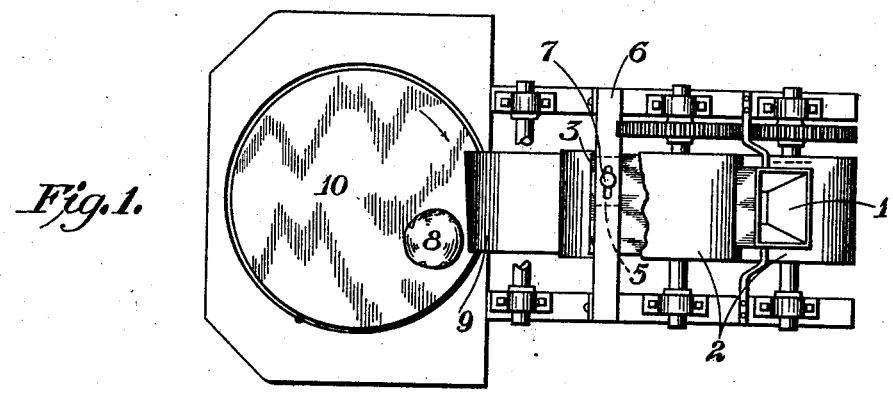
Figure 3:
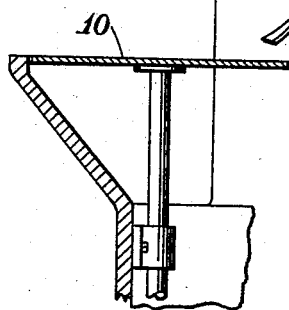
Fig. 3 is a detail view in perspective of the apron and the stop, the positions of the dough piece before and after contacting with the stop being shown in full and dotted lines respectively.

We apply our invention to a machine that includes an upper pair of rolls and a lower pair connected by an inclined apron or chute, means being provided for operating both pairs of rolls simultaneously. The upper pair of rolls receives a spherical or ball-shaped piece of dough and rolls and elongates it into elliptical shape. The inclined apron receives the elliptical shaped piece of dough discharged from the first pair of rolls, and allows the dough to slide downward into the second pair of rolls that roll it thinner. In our invention there is added to the above machine a stop means, in conjunction with the inclined apron, adapted to be contacted by an advancing edge of the dough piece during its downward sliding movement to momentarily retard it and thereby rotate it approximately a quarter of a turn. Thus the dough piece is first passed through a pair of rolls that discharge it in elongated or somewhat elliptical shape, substantially flat and relatively thick. Then it slides down along the inclied apron and is turned by encountering the aforesaid stop piece or stationary lug. It enters the second pair of rolls and is rolled crosswise, its form being converted from substantially elliptical to substantially circular. It is thus discharged from the second pair of rolls as a relatively thin flat circular disk, which when baked will produce a bun of the desired shape and size.

The invention further includes means for adjusting the position of the stop in a direction transverse to the path of travel of the dough piece down the apron, in order to adapt the machine for larger or smaller dough pieces.

In the drawings numeral 1 indicates the ordinary hopper into which a spherical ball of dough is dropped. 2 indicates the first or upper pair of rolls. 3 is the inclined apron, down which the flattened elliptical dough piece slides. 4 is the second pair of rolls that reduces the dough piece to its final thickness.

This arrangement so far described of the two sets of rolls and the intermediate apron is well known in the art.

Our invention is found in supplying a stationary stop piece 5 suitably supported and positioned to be engaged by the edge of the downwardly sliding dough piece which is thereby rotated in its own plane with a sliding movement on the apron and without folding or turning upside down. The stop piece 5 may conveniently be mounted on a stationary bar 6 and is preferably, although not necessarily, adjustable toward and from the path of travel of the dough piece by means of a bolt 7, in an elongated slot 7ª. Instead of adjusting the stop it is possible to shift the position of the hopper in a direction lengthwise the roller 2, as shown by dotted lines in Fig. 1. In this manner greater or less contact of the sliding piece with the stop 5 may be had and the same result attained as if the stop itself were adjusted.

Figure 2:
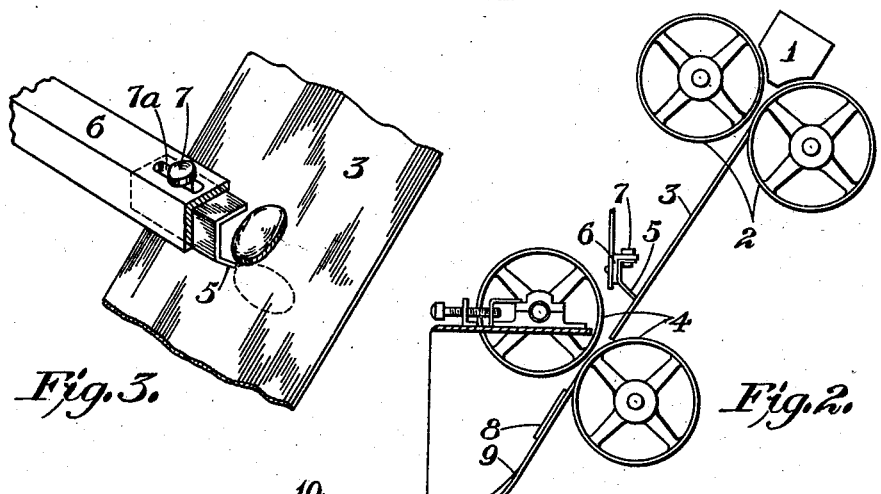
Fig. 2 is a side view, partly in section, of the rolls and apron.

The circular disks of dough 8 are delivered from the second pair of rolls 4 onto an inclined apron 9 whose discharge end is in slightly tilted position, being higher at one edge than at the other, and beneath the discharge end of this apron is a horizontal disk 10 that revolves about a vertical axis. As the dough piece leaves the second pair of rolls and passes off the end of the discharge apron 9 the tilted position of the discharge end of the apron, shown in Fig. 2, causes an edge of the dough piece to contact with the traveling surface of the large disk conveyor 10 and commence moving with the disk before the main part of the dough piece drops upon it, thus preventing the dough piece from buckling or getting out of shape when it slides from the discharge apron 9 onto the moving surface of the disk.

Having thus described our invention, what we claim and desire to secure by Letters Patent is:

1. In a dough forming machine including a pair of initial rolls and a pair of final rolls connected by an inclined apron, stop means interposed between said two pairs of rolls and located with relation to the apron so as to engage the edge of a piece of dough sliding down the apron from the first set of rolls to the second set, whereby to rotate the moving dough piece in its own plane and thereby cause it to present itself to the final pair of rolls for rolling in a direction substantially at right angles to the direction of rolling in said initial pair of rolls, for the purposes set forth.

2. In a dough forming machine including a pair of initial rolls and a pair of final rolls connected by an inclined apron, stop means interposed between said two pairs of rolls and located with relation to the apron so as to engage the edge of a piece of dough sliding down the apron from the first set of rolls to the second set, whereby to rotate the moving dough piece in its own plane and thereby cause it to present itself to the final pair of rolls for rolling in a different direction, and transverse adjusting means for said stop.

3. In a dough forming machine including a pair of initial rolls and a pair of final rolls connected by an inclined apron, adjustable stop means interposed between said two pairs of rolls and located with relation to the apron so as to engage the edge of a piece of dough sliding down the apron from the first set of rolls to the second set, whereby to rotate the moving dough piece in its own plane and thereby cause it to present itself to the final pair of rolls for rolling in a different direction, an inclined apron whose discharge end is slightly tilted, and a traveling conveyor beneath said discharge end.

In testimony whereof, we affix our signatures.

FRANK J. WOLFARTH.
WILLIAM W. DUANT.